United States Patent

Nakao

[11] Patent Number: 5,779,230
[45] Date of Patent: Jul. 14, 1998

[54] METHOD OF MAKING A COMPOSITE BUTTON OF AN ELECTRICAL DEVICE

[75] Inventor: Junichi Nakao, Tokyo, Japan

[73] Assignee: NEC Corporation, Tokyo, Japan

[21] Appl. No.: 659,187

[22] Filed: Jun. 6, 1996

[30] Foreign Application Priority Data

Jun. 6, 1995 [JP] Japan ................ 7-162900

[51] Int. Cl.⁶ ........................................ B29C 45/16
[52] U.S. Cl. .................. 264/130; 264/135; 264/242; 264/250; 264/264
[58] Field of Search .................. 264/130, 135, 264/250, 242, 264, 316

[56] References Cited

U.S. PATENT DOCUMENTS

| | | | |
|---|---|---|---|
| 5,484,566 | 1/1996 | Gabbard | 264/250 |
| 5,542,171 | 8/1996 | Juskey et al. | 264/130 |

FOREIGN PATENT DOCUMENTS

| | | |
|---|---|---|
| 0 064 041 | 11/1982 | European Pat. Off. |
| 0 123 184 | 10/1984 | European Pat. Off. |
| 0148611 | 7/1985 | European Pat. Off. |
| 0 600 634 A1 | 6/1994 | European Pat. Off. |
| 0 615 264 A2 | 9/1994 | European Pat. Off. |
| 2 195 102 A | 3/1988 | United Kingdom |
| 2 239 854 A | 7/1991 | United Kingdom |

*Primary Examiner*—Jan H. Silbaugh
*Assistant Examiner*—Edmund H. Lee
*Attorney, Agent, or Firm*—Sughrue, Mion, Zinn, Macpeak & Seas, PLLC

[57] ABSTRACT

A composite button of an electrical device has a frame body (1) with a through bore that terminates at openings, and a button portion (2) with a pressing portion (3) extended through the through bore and a flange portion (4) fused to the frame body (1). A silicone resin layer (5, 24) is interposed between the frame body and the flange portion, and surrounds one of the openings. A method of manufacturing a composite button of an electrical device by molding a frame body, forming a silicone resin layer on a surface of the frame body, and simultaneously molding a button portion to a predetermined shape while fusion boding areas of the button portion contacting the frame body.

5 Claims, 4 Drawing Sheets

METHOD OF MAKING A COMPOSITE BUTTON OF AN ELECTRICAL DEVICE

BACKGROUND OF THE INVENTION

This invention relates to a composite molded product comprising a plurality number of different materials, particularly to a composite molded product which can be used as a button of electric devices and a method of manufacturing the same.

A composite molded product in which a thermoplastic resin material and a thermoplastic elastic material are joined has been utilized for, as a button of electric devices such as a portable telephone, a personal computer, etc. This composite molded product comprises a frame body comprising a thermoplastic resin material and a button portion comprising a thermoplastic elastic material, and a movable pressing portion and a flange portion joining to the frame body are provided at the button portion.

Such a composite molded product has been manufactured by fusion bonding the thermoplastic resin material and the thermoplastic elastic material in a mold using a two-color molding machine.

However, in the conventional composite molded product used for a button, the contacting surface of the thermoplastic resin material and that of the thermoplastic elastic material are all joined so that it may sometimes cause disadvantages. Such a problem is that deflection at the flange portion of the button portion is little whereby stroke at the pressing portion cannot be made large.

SUMMARY OF THE INVENTION

An object of the present invention is to provide a composite molded product suitable for the use of a button of electric devices and a method of manufacturing the same.

In order to accomplish the object, the composite molded product of the present invention has a constitution that a frame body and a button portion are joined. Also, the button portion has a pressing portion so provided in a through hole of the frame body as to freely movable and a flange portion which is to be fused to the frame body. A thin film layer is provided at adjacent to the opening of the through hole, and the frame body and the button portion are not joined to the region at which the thin film is formed. The frame body can be formed by a thermoplastic resin, the button portion a thermoplastic elastic material and the thin film layer a silicone resin.

Also, the method of manufacturing the above composite molded product comprises the steps of (a) molding a frame body comprising, for example, a thermoplastic resin, by a first mold; (b) forming a thin film comprising, for example, a silicone resin, on the surface of the frame body, and (c) fusion bonding a button portion comprising, for example, a thermoplastic elastic material, by a second mold, onto the surface of the above frame body at which the above thin film layer is formed and molding it to a predetermined shape.

The step of molding a thermoplastic resin by the first mold and the step of forming a thin layer film on the surface of said frame body of the thermoplastic resin molded product may be carried out simultaneously. Also, for formation of the silicone resin layer, it may be employed a method in which a thin layer film previously printed on a film is transferred onto the thermoplastic resin.

In the above composite molded product, at the contacting surface of the frame body comprising a thermoplastic resin material and the flange portion comprising a thermoplastic elastic material, the silicone film layer is partially provided as a thin layer which is subjected to fusion bonding to the thermoplastic resin but not fusion bonding to the thermoplastic elastic material. At the portion in which the silicone resin layer is formed, the frame body and the flange portion are not subjected to fusion binding so that the flange portion is markedly deflected whereby stroke at the pressing portion can be made large.

Also, by simultaneously carrying out molding of the thermoplastic resin and transfer of the silicone resin layer from the film to which the silicone resin layer is previously printed, the composite molded product can be manufactured with extreme effectiveness in bulk-production.

BRIEF DESCRIPTION OF THE DRAWINGS

The above and other objects, features and advantages of the present invention will become apparent from the following detailed description when taken with the accompanying drawing in which.

DETAILED DESCRIPTION OF THE PREFERRED EMBODIMENTS

Figure 1:
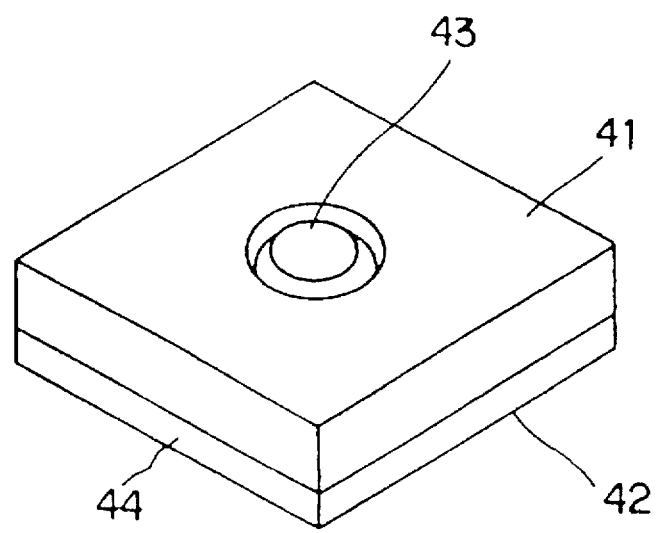
FIG. 1 is a perspective view of a molded product to be used for the conventional button switch of an electric device.
Figure 2:
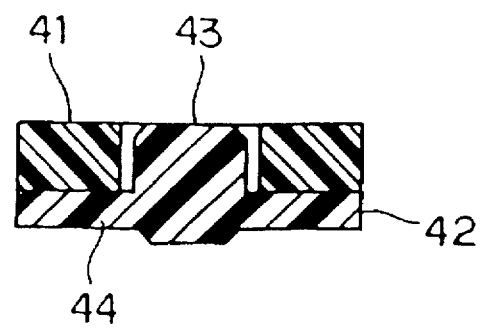
FIG. 2 is a sectional view of a molded product to be used for the conventional button switch of an electric device.

First, a conventional composite molded product comprising a thermoplastic resin and a thermoplastic elastic material is explained. FIG. 1 is a perspective view of the conventional composite molded product. At a frame body 41 comprising a thermoplastic resin, a through hole is formed. Also, a button portion 42 comprising a thermoplastic elastic material has a flange portion 44 and a pressing portion 43. The flange portion 44 is joined to the frame body 41 and the pressing portion 43 is provided at the through hole of the above frame body 41. FIG. 2 is a sectional view of the composite molded product shown in FIG. 1. The contacting surfaces of the flange portion 44 to the frame body 41 is completely joined.

As can be seen from FIG. 2, in the conventional composite molded product, the contacting surfaces of the flange portion 44 and the frame body 41 are all subjected to fusion bonding so that only a little stroke can be obtained when the pressing portion 43 is pressed. However, when the composite molded product is used as a button for electric devices, it is desired to obtain a large stroke.

Figure 3:
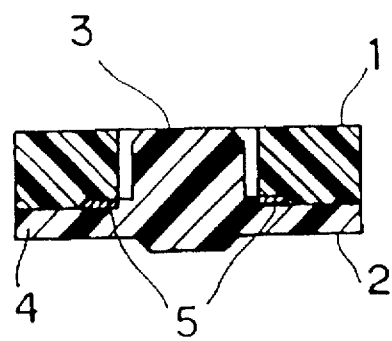
FIG. 3 is a sectional view showing an example of the composite molded product of the present invention.

Next, an example of the composite molded product of the present invention is explained. FIG. 3 is a sectional view of an example of the composite molded product according to the present invention. A frame body 1 having a through hole at the center portion and a flange portion 4 of a button portion 2 are subjected to fusion bonding. However, a silicone resin layer 5 is formed at a region adjacent to the opening of the through hole which is at the joining portion of the frame body 1 and the flange portion 4. The silicone resin layer 5 can be subjected to fusion bonding to the frame body 1 comprising a thermoplastic resin but not subjected to fusion bonding to the flange portion 4 comprising a thermoplastic elastic material. Therefore, when the pressing portion 3 is pressed, the flange portion 4 is markedly deflected whereby a large stroke can be obtained. Thus, the composite molded product shown in FIG. 3 sufficiently acts as a button for electric devices.

In this example, as a thermoplastic resin, a polycarbonate resin, ABS (acrylonitrile-butadiene-styrene copolymer) resin, etc., can be used. Also, as a thermoplastic elastic material, a styrene series elastomer, ethylene series elastomer, etc., can be used. The composite molded product may have any size depending on the kinds of electric devices to be applied.

Next, an example of manufacturing method of the composite molded product according to the present invention is explained.

Figure 4:
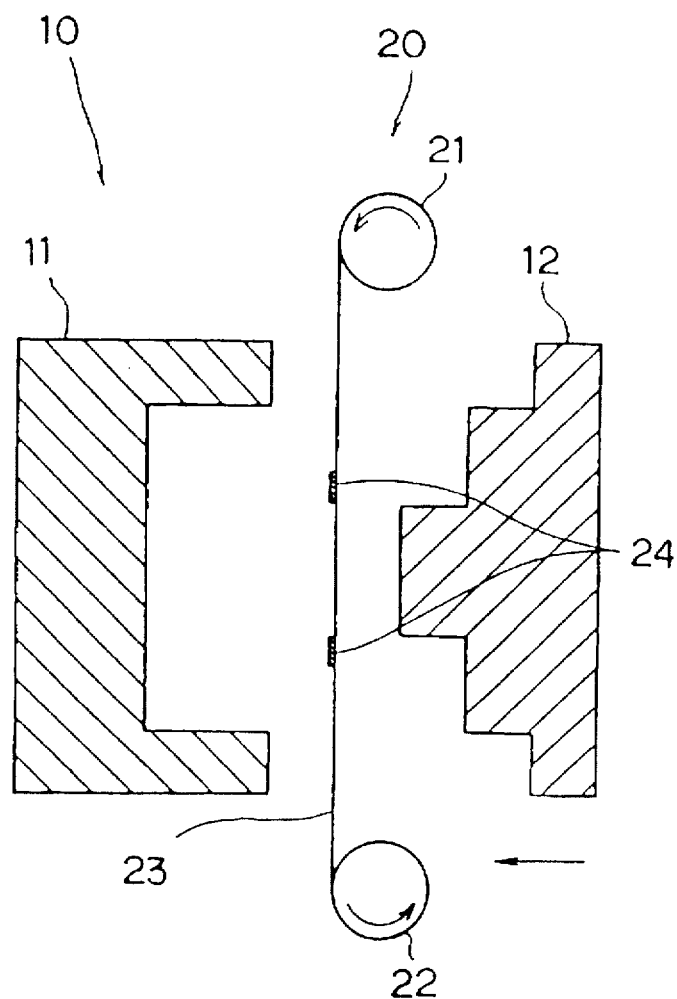
FIG. 4 is a drawing showing a first metal mold and a film to which a silicone resin layer is printed of the present invention.

FIG. 4 is a sectional view of a first mold 20 for molding a frame body 1. This mold comprises a fixed mold 11 and a movable mold 12. The mold is usually made of a metal, but a material such as ceramic may be used. Between these molds, a film 23 to which a silicone resin layer 24 is printed is provided. The film 23, may comprise, for example, a polystyrene, etc., set to a delivery roller 21 and a wind roller 22, and transfers between the molds 11 and 12 by way of rotation of the rollers 21 and 22.

Figure 5:
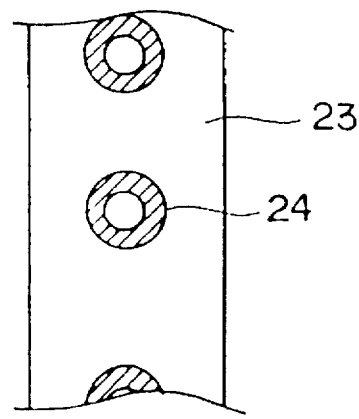
FIG. 5 is a plan view of a film to which a silicone layer is printed.

The silicone resin layer 24 is previously printed with a ring shape on the film 23 as shown in FIG. 5. Also, an inside portion of the ring shape of the silicone resin layer 24 printed on the film 23 is previously blanked. An inner diameter of the ring shape substantially corresponds to the diameter of the through hole of the frame body 1 of the composite molded product. Thus, the silicone resin layer 24 is provided adjacent to the peripheral of the opening of the above through hole.

Figure 6:
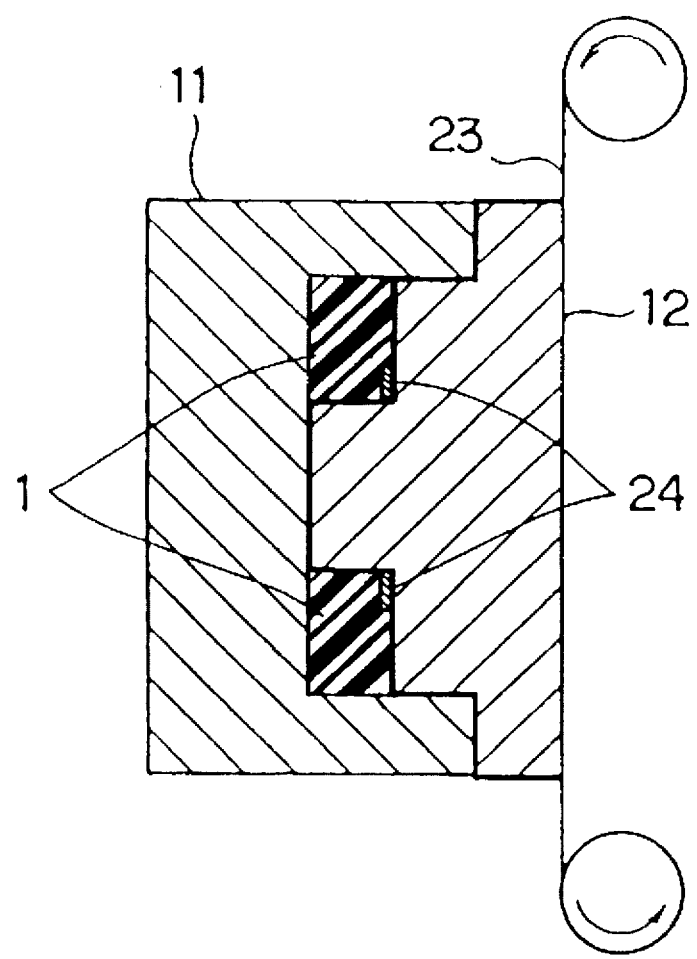
FIG. 6 is a sectional view showing the steps of molding of a thermoplastic resin and transfer of a silicone resin layer.

When the inside of the ring shape of the silicone resin layer 24 printed on the film 23 is not blanked, a printed position and a shape of the silicone resin layer 24 are previously adjusted so that the silicone resin layer 24 is placed at the position as shown in FIG. 6 when the film 23 is held between the molds 11 and 22 and a polycarbonate resin is injected in a cavity.

First, as shown in FIG. 4, the fixed mold 11 and the movable mold 12 are spaced apart a certain distance, and the film 23 to which the silicone layer 24 is printed is placed at the predetermined position therebetween. Next, the movable mold 12 is transferred to the direction of the arrow in FIG. 4. The movable mold 12 is moved and presses the film 23, and the film 23 is inserted between the fixed mold 11 and the movable mold 12.

Next, as shown in FIG. 6, a polycarbonate resin is injected into the cavity to mold a frame body 1. At this time, the silicone resin layer 24 is transferred to the frame body 1 at the portion adjacent to the peripheral of the opening portion of the through hole thereof. Injection of the polycarbonate resin is carried out by setting the nozzle temperature of about 200° C. and the mold temperature of about 80° to 90° C.

The above-mentioned process is an effective method in which molding of the frame body 1 and formation of the silicone resin layer 24 can be carried out simultaneously. However, it can be also carried out to the step of molding a thermoplastic resin firstly and then the step of forming a silicone resin layer at the predetermined portion of the thermoplastic resin molded product (frame body 1).

After completion of molding the frame body 1, the movable mold 12 is returned to the original position, the winding roller 22 is rotated to wind the film 23, and a new silicone resin layer is moved to the predetermined position. Thus, when the film 23 to which the silicone resin layers 24 are printed is previously prepared, molding of the frame body 1 and formation of the silicone resin layer can be carried out continuously and effectively.

Figure 7:
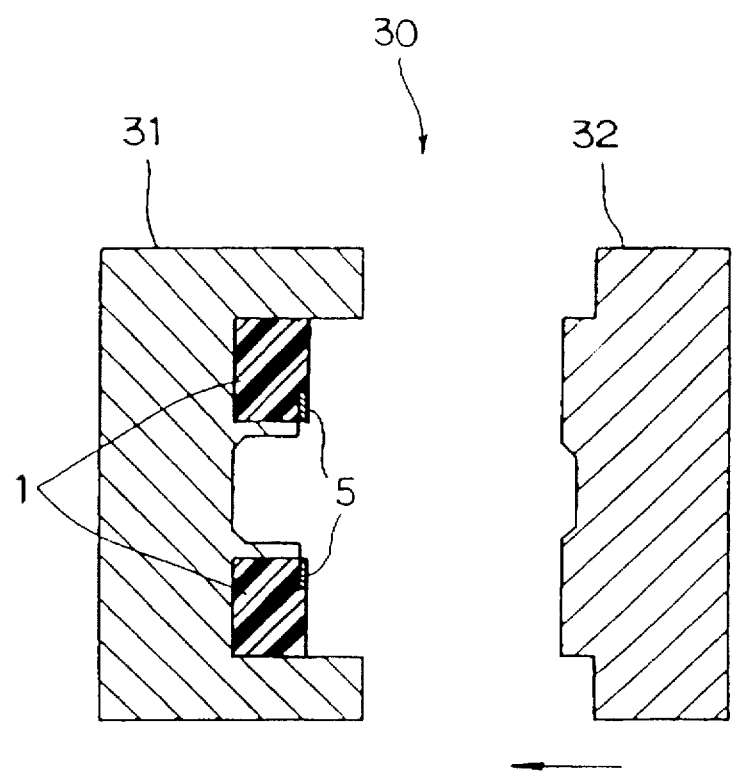
FIG. 7 is a sectional view showing a thermoplastic resin molded product to which a silicone resin layer is transferred, which is provided to a second mold.
Figure 8:
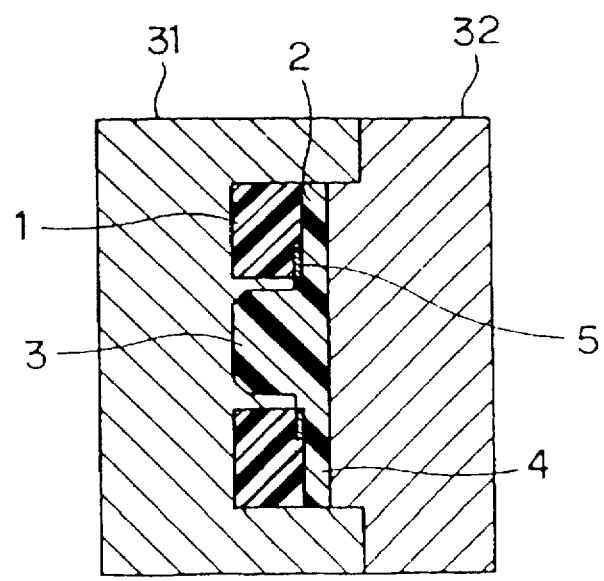
FIG. 8 is a sectional view showing the step of molding a thermoplastic elastic material.

Next, as shown in FIG. 7, the frame body 1 to which the silicone layer 5 is formed is placed to a fixed mold 31 of a second mold 30. As shown in FIG. 8, a movable mold 32 is attached to the fixed mold 31 and a styrene series elastomer is injected into a space portion between the fixed mold 31 and the movable mold 32 to mold a button portion 2. This injection is carried out by setting the nozzle temperature of about 170° C. to about 200° C. and the mold temperature of about 30° C. to about 90° C.

At this time, the silicone resin does not fuse to the styrene series elastomer which is a thermoplastic elastic material and remains fused to the polycarbonate which is a thermoplastic resin. That is, according to the above process, a composite molded product in which the flange portion 4 of the button portion fuses to the frame body 1 but does not fuse to the silicone resin layer 5 can be manufactured.

As described above, in the composite molded product of the present invention, the silicone resin layer 5 is provided at the position which is between the flange portion 4 of the button portion 2 and the frame body 1, and adjacent to the opening portion of the frame body 1. This silicone resin layer 5 fuses to the frame body 1 but does not fuse to the flange portion 4 so that when the pressing portion 3 is pressed, the flange portion 4 is markedly deflected whereby a large stroke can be obtained.

Also, in the method of manufacturing the composite molded product of the present invention, a fusible portion and a non-fusing portion can be freely provided to the contacting surface of the thermoplastic resin and the thermoplastic elastic material so that, for example, a composite molded product which is applied to a button of electric devices can be manufactured easily and effectively.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

I claim:

1. A method of manufacturing a composite button of an electrical device, comprising the steps of:
   (a) molding a frame body with a through bore that terminates at an opening in a contact surface, the contact surface having a film area that surrounds the opening and a fusion area that surrounds the film area;
   (b) forming a thin film layer on the film area of the contact surface; and
   (c) molding a button portion having a movable pressing portion extending within the bore and a flange which is positioned adjacent the thin film layer and the fusion area of the frame body,
   wherein, as the flange is formed, fusion bonding occurs between areas of the flange contacting the fusion areas, and no fusion bonding occurs between areas of the flange contacting the film layer such that the flange is separateable from the film layer and deflectable when the button is pressed.

2. The method of manufacturing a composite button of an electrical device according to claim 1, comprising using a thermoplastic resin as a material for the frame body, using a thermoplastic elastic material as a material for the button portion and using a silicone resin layer as a material for the thin film layer.

3. The method of manufacturing a composite button of an electrical device according to claim 1, wherein the step of molding the frame body and the step of forming the thin film layer are carried out simultaneously.

4. The method of manufacturing a composite button of an electrical device according to claim 1, further including the step of providing said thin film layer printed onto a film and transferring said thin film layer to the frame body.

5. The method of manufacturing a composite button of an electrical device according to claim 1, comprising the steps of:

molding the frame body by setting a molding nozzle temperature at about 200° C. and a mold temperature in a range of about 80° C. to about 90° C.; and molding the button portion by setting a molding nozzle temperature in a range of about 170° C. to about 200° C. and a mold temperature in a range of about 30° C. to about 200° C.

* * * * *